Figure 1:
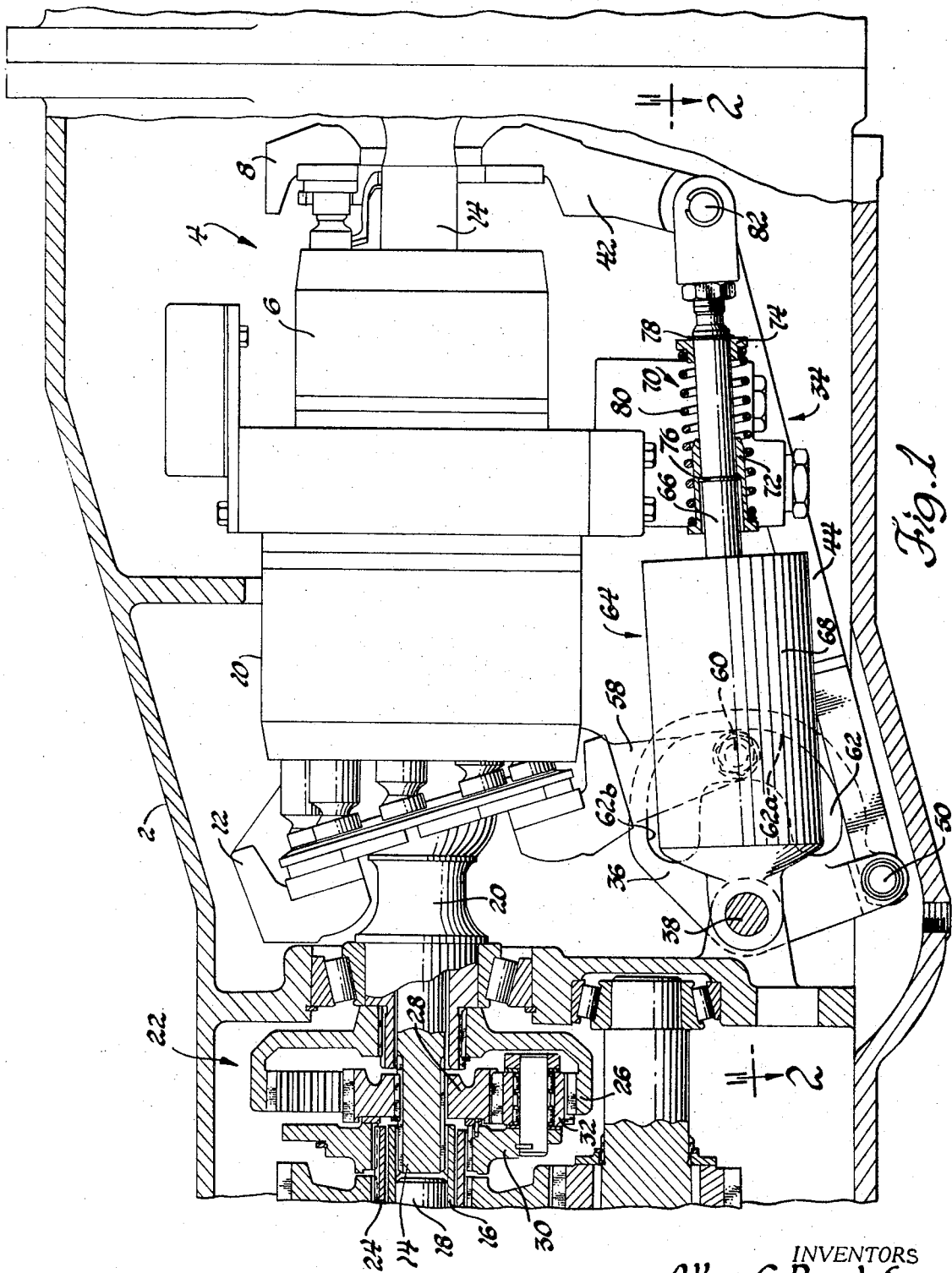

United States Patent
Rusch et al.

[11] 3,757,525
[45] Sept. 11, 1973

[54] HYDROSTATIC TRANSMISSION

[75] Inventors: Allan C. Rusch, Livonia; John Bubak, Warren, both of Mich.

[73] Assignee: Massey-Ferguson, Inc., Detroit, Mich.

[22] Filed: Nov. 1, 1971

[21] Appl. No.: 194,106

[52] U.S. Cl. ................................................. 60/492
[51] Int. Cl. ............................................... F16h 39/46
[58] Field of Search ............... 60/52 VS, 53 A, 490, 60/491, 492

[56] References Cited
UNITED STATES PATENTS

| | | | |
|---|---|---|---|
| 3,052,098 | 9/1962 | Ebert | 60/53 A |
| 3,126,707 | 3/1964 | Hann et al. | 60/53 A |
| 3,142,964 | 8/1964 | Thoma et al. | 60/53 A |
| 3,247,919 | 4/1966 | Moon | 60/53 A |

Primary Examiner—Edgar W. Geoghegan
Attorney—John L. Shortley et al.

[57] ABSTRACT

A hydrostatic transmission including a variable capacity pump controlled by an adjustable swash plate and a variable motor driven by the pump and controlled by an adjustable swash plate. Mechanical motion transmitting means connects the pump and motor swash plates for causing movement of one of the swash plates at a predetermined variable rate so that a single hydraulic piston and cylinder unit can adjust both swash plates simultaneously.

7 Claims, 2 Drawing Figures

INVENTORS
Allan C. Rusch &
BY John Bubak
Barnard, McGlynn & Reising
ATTORNEYS

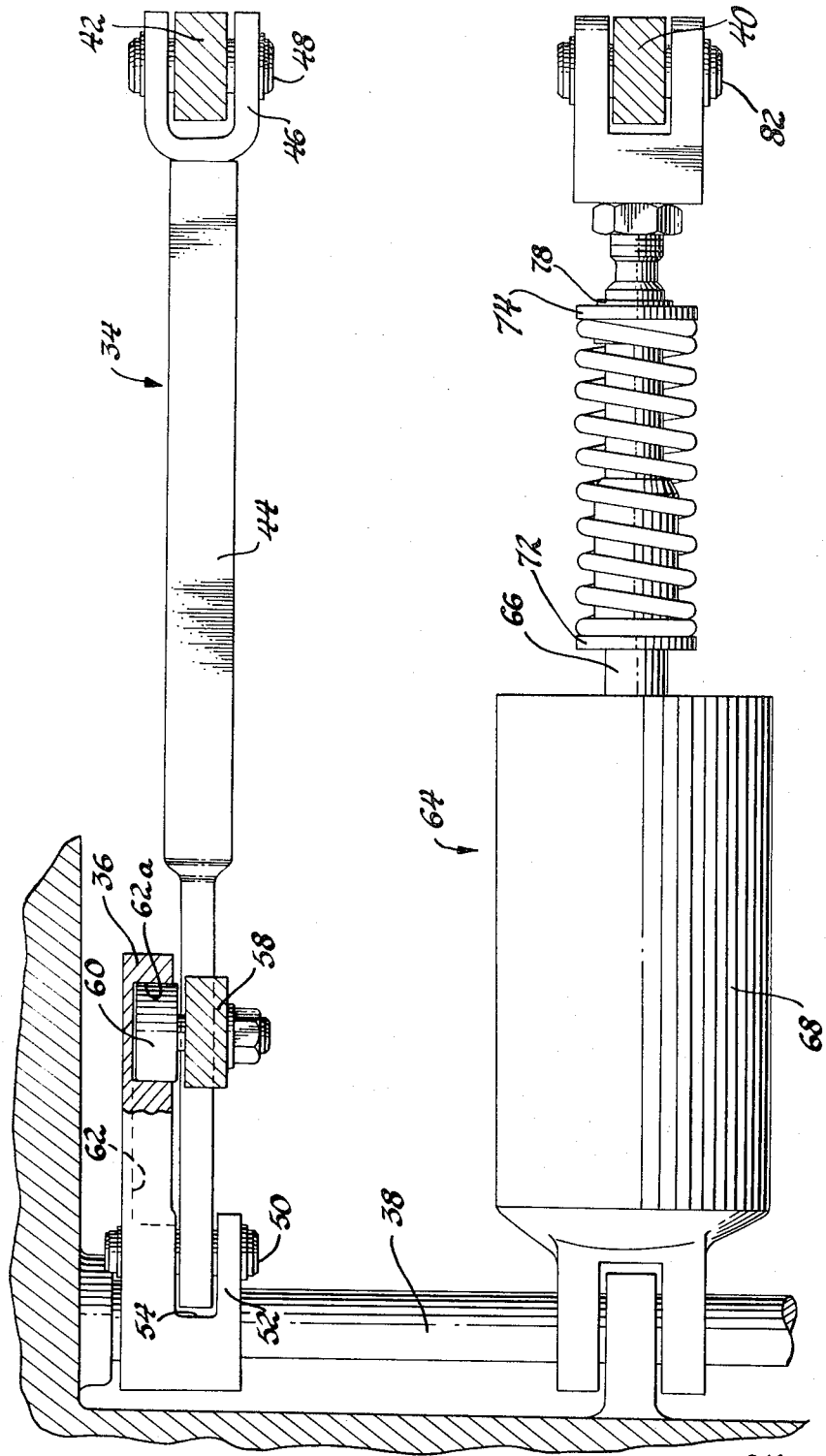

HYDROSTATIC TRANSMISSION

This invention relates generally to hydrostatic transmissions, and is particularly concerned with hydrostatic transmissions of the type including a variable capacity pump controlled by a variable angle wobbler or swash plate control member as well as a variable capacity motor controlled by a variable angle wobbler or swash plate control member.

In hydrostatic transmissions having both a variable capacity pump and a variable capacity motor, the displacement of both the pump and the motor is controlled by varying the position of a wobbler or swash plate control member. Generally, two piston and cylinder assemlies are required for such transmissions, one for adjusting the position of the motor wobbler or swash plate, and one for adjusting the position of the pump wobbler or swash plate. Moreover, different speed and load requirements can be met only by adjusting the swash plate at different rates. Agricultural tractors and similar vehicles require transmissions that can provide a wide variety of output torques to meet the varying operating conditions of the vehicle. In order to change from one operating condition to another, the swash plates frequently must be adjusted at variable rates, that is the angle of adjustment of the pump swash plate may frequently be different from the angle of adjustment of the motor swash plate for efficient performance.

Prior art transmissions of this type generally include a separate hydraulic power system for adjusting the pump and motor swash plates and a complex linkage system interconnecting the two hydraulic power systems with a control handle. The hydraulic power systems generally include a piston and cylinder assembly for each swash plate, and a control valve and follow-up mechanism for each of the piston and cylinder assemblies. See, for example, U.S. Pat. Nos. 3,508,401 and 3,522,704.

An object of this invention is to provide mechanical motion transmitting means connecting the pump and motor swash plates for causing one of the swash plates to move in response to movement of the other of the swash plates at a predetermined variable rate so that a single hydraulic power element can position both swash plates.

A further object is to provide a hydrostatic transmission having a variable capacity pump and a variable capacity motor with motion transmitting means connecting the pump and motor swash plates that can be operated by a single power element to cause the pump and motor swash plates to assume the proper position to provide optimum performance for varying conditions of operation.

In carrying out the foregoing, and other objects, a hydrostatic transmission according to the present invention includes a variable angle pump swash plate control member and a variable angle motor swash plate control member. Motion transmitting means interconnects the pump and motor control members causing movement of one of the control members in response to movement of the other of the control members at a predetermined variable rate so that in any position of one of the control members, the other control member is in a predetermined position with respect thereto to provide a predetermined output torque or operating efficiency for the transmission. The motion transmitting means includes a cam lever which is movable in response to movement of the pump swash plate or control member to cause movement of the motor control member at a rate which is determined by the relative angular positions of the pump and motor control members. The cam lever is connected through a link with the pump control member so that cam lever rotates about its fulcrum in response to movement of the pump control member. The motor control member has a follower which engages the cam surface on the cam lever so that rotation of the cam lever in response to angular adjustment of the pump control member causes angular adjustment of the motor control member in accordance with the contour of the cam surface. A power element in the form of a piston and cylinder assembly is connected with one of the control members to provide a power adjustment of the control members during operation.

Other objects, advantages and features of the invention will become apparent from the following description taken in connection with the accompanying drawings in which:

FIG. 1 is a plan view, partially in section, of a hydrostatic transmission for a tractor or similar vehicle; and FIG. 2 is a view taken on lines 2—2 of FIG. 1.

In FIG. 1, reference numeral 22 indicates a housing for a hydrostatic transmission designated collectively by reference numeral 4. The hydrostatic transmission 4 includes a variable capacity pump 6 having a variable angle swash plate control member 8 for controlling the displacement of the pump. The hydrostatic transmission 4 also includes a variable capacity motor 10 hydraulically connected to be driven by the pump 6, and having a variable angle swash plate control member 12 for controlling the displacement of the motor 10.

Pump 6 is driven by an input shaft 14 connected with the engine or power plant of the vehicle. The input shaft 14 extends through the transmission and is connected by a coupler 16 to a power take-off shaft 18 so that the power take-off shaft is constantly driven by the input shaft at a speed proportional to the speed of the engine. The motor 10 has an output shaft 20 which is connected through a planetary gear assembly, indicated genrally by reference numeral 22, with a drie shaft 24.

The planetary gear assembly 22 includes a ring gear 26 which is splined to the motor shaft 20, a sun gear 28 which is splined to the input shaft 14, and a planet gear 32 carried by a planet carrier 30 which in turn is splined to the drive shaft 24. The planet gear 32 is meshed with the ring gear 26 and the sun gear 28. Therefore, the speed and direction of rotation of the planet carrier 30, and hence the drive shaft 24, is determined by the relative speed and direction of the motor shaft 20 and sun gear 28. If the motor shaft 20 is stationary, the ring gear 26 will be stationary and the planet carrier 30 will be driven solely by the sun gear 28. Therefore, the speed and direction of the drive shaft 24 is varied in accordance with variations in the speed and direction of the motor shaft 20. The speed and direction of the motor shaft 20 is determined by the positions of the swash plate control members 8 and 12.

In order to obtain the desired speed, output torque and output power for the drive shaft 24 under various operating conditions, the relative angular positions of the pump control member 8 and motor control member 12 must vary to meet the predetermined performance requirements of the transmission. For example, there may be a range of output speed, torque and power requirements that can best be obtained by changing the angle of the pump control member 8 with little or no corresponding change in the angle of the motor control member 12. There may be still another range of output speed, torque and power requirements that can best be obtained by adjusting the angle of both the pump control member 8 and the motor control member 12 to obtain the different speed, torque and power values throughout the range. Thus, in one range, the change is brought about solely by changing the angle of the pump control member 8, and in the other range, a change is brought about by adjusting both the pump and motor control members 8 and 12, respectively, but by different amounts. In accordance with the present invention, motion transmitting means indicated collectively by reference numeral 34 interconnects the pump and motor control members 8 and 12 causing movement or adjustment of one of the control members in response to movement of the other control member at a predetermined variable rate.

The motion transmitting means 34 includes a cam lever 36 fulcrummed on a fixed support in the form of a rod 38 mounted on supporting portions of the housing 2. The cam lever is movable about the axis of the rod 38 in response to movement of the control members 8 and 12 to cause movement of one of the control members relative to the other control member at a rate that varies in accordance with the relative angular positions of the control members 8 and 12.

The pump control member 8 has a pair of spaced arms 40 and 42 (FIG. 2). A link 44 connects the pump control member 8 with the cam member 36 to cause rotation of the cam lever 36 in response to movement of the pump control member 8. The link 44 has a bifurcated or forked end portion 46 which receives arm 42 of the control member 8 and is pivotally connected thereto by a pin 48. The cam lever 36 is formed with a lug 52 (FIG. 2) defining a slot 54 which receives the other end of link 44, and a pin 50 pivotally connects link 44 with the cam lever 36.

The motor control member 12 is formed with an arm 58 on which is mounted a cam follower roller 60. Roller 60 is engaged in a cam groove 62 formed in the cam lever 36. Movement of the pump control member 8 angularly causes link 44 to rotate the cam lever 36 about its fulcrum 38. Rotation of lever 36 in turn acts through the cam follower 60 to cause angular adjustment of the motor control member 12 at a rate determined by the position of the cam follower 60 in the cam groove 62. The cam groove 62 is roughly of U-shape having a base portion 62a and leg portions 62b. The configuration of the cam groove 62 determines the angular relationship between the pump control member 8 and the motor control member 12 and hence the relationship between the pump displacement and the motor displacement.

Power element 64 includes a piston slidably mounted in a cylinder 68. The piston has a rod 66 which reciprocates with respect to cylinder 68 in response to the delivery of hydraulic oil to and from the cylinder. Cylinder 68 is pivotally mounted on the rod 38, and the piston rod 66 is pivotally connected by a pin 82 with arm 40 of the pmp control member 8.

A return-to-neutral spring assembly designated collectively by reference numeral 70 is mounted on the piston rod 66. The spring assembly 70 includes a pair of flanged spring seat members 72 and 74 slidably mounted on piston rod 66, a pair of snap rings 76 and 78 mounted on rod 66 in spaced locations along the length of rod 66, and a spring 80 seated between the spring seat members 72 and 74 and biasing the spring seat members 72 and 74 toward engagement with the snap rings 76 and 78 respectively. The power element 64 is connected in a conventional closed loop servo system (not shown) under the control of the vehicle operator so that the control members 8 and 12 can be adjusted as desired by the operator. As the piston rod 66 is retracted into cylinder 68, or toward the left in FIG. 1, the spring seat member 72 engages the end wall of cylinder 68, and spring 80 is compressed upon further movement of rod 66 toward the left with respect to the cylinder. In the event of a subsequent loss of pressure, spring 80 will expand to return control member 8 to a neutral position.

While a specific form of the invention has been illustrated and described in the foregoing specification and accompanying drawings, it whould be understood that the invention is not limited to the exact construction shown but that various alternatives in the construction and arrangement of parts, all falling within the scope and spirit of the invention will be apparent to thos skilled in the art.

We claim:

1. Hydrostatic transmission apparatus comprising: a fixed support; a pump; an adjustable pump control member for controlling the displacement of the pump; a motor hydraulically connected to be driven by said pump, and an adjustable motor control member for controlling the displacement of the motor, actuating means characterized in that a cam lever and a link are connected between said pump and motor control members for causing movement of one of said control members in response to movement of the other of said control members and the combined lever and link are in side-by-side relation with the actuating means and that said cam lever and actuating means are pivotally connected to such fixture support.

2. Apparatus as claimed in claim 1 characterized in that a cam surface is defined on said cam lever and a follower on said other control member is slidably engaged with said cam surface.

3. Apparatus as claimed in claim 2 characterized in that said cam surface comprises a groove in said cam lever and said follower is engaged in said groove.

4. Hydrostatic transmission apparatus as set forth in claim 1 wherein said cam lever and said actuating means are mounted to pivot about the same axis.

5. Hydrostatic transmission apparatus as set forth in claim 1 wherein said fixed support is a fixed shaft extending transverse to said pump and motor and at one end thereof.

6. Hydrostatic transmission apparatus as set forth in claim 9 which said shaft is at the motor end.

7. Hydrostatic transmission apparatus as set forth in claim 1 wherein said actuating means is connected to one control member and said cam lever is connected to the other control member.

* * * * *